Nov. 9, 1926.
J. J. SPRUNGER
1,606,110
BEET TOPPER
Filed Dec. 20, 1924
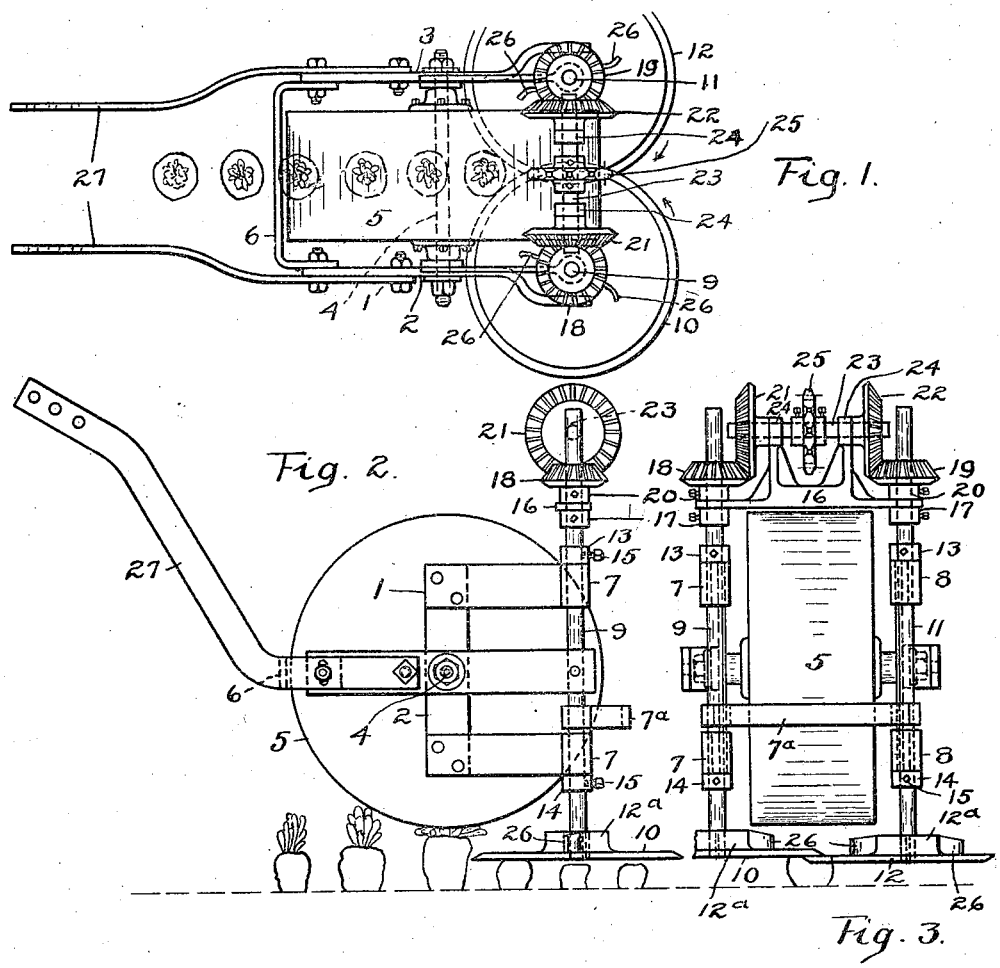
INVENTOR.
J. J. Sprunger
BY Elwin M. Hulse
ATTORNEY Patented Nov. 9, 1926.

1,606,110

UNITED STATES PATENT OFFICE.

JACOB J. SPRUNGER, OF FORT WAYNE, INDIANA.

BEET TOPPER.

Application filed December 20, 1924. Serial No. 757,090.

The invention relates to harvesting machines and is particularly directed to machines for cutting off the tops of sugar beets, beans and other vegetables prior to their removal from the ground.

A certain portion of the top of a sugar beet below the leaves is practically free from sugar and the refineries require that this undesirable portion shall be removed together with the leaves.

The topping of sugar beets is generally accomplished by hand notwithstanding machines for the purpose have been devised heretofore which are intended to remove the tops prior to the removal of the beets from the ground. The difficulty encountered in machine removal of the tops is caused by the irregular heights of the portion of the beets that projects from the ground. Hence provision must be made in the machine by which the cutting members are caused to engage each beet at the proper point to remove the undesirable portion and not injure the remainder of the same.

The object of my invention is to provide a simple and cheap machine by which the undesirable portions of sugar beets and other products of the soil may be economically removed prior to the removal of the product from the ground, and with least possible injury to the desirable part of the products.

The invention consists in the provision of rotating cutting members and a rolling gauge member in advance of the cutting members by which the point of engagement of the cutting members with the beets or other products is controlled.

The invention is illustrated in the accompanying drawings in which—

Figure 1 is a plan view of a machine embodying the invention; Fig. 2 a side elevational view of the same and Fig. 3 a rear elevational view of the same.

In the illustrative embodiment of the invention 1 is a suitable frame, comprising, in the present embodiment, two side members 2 and 3 in which is secured an axle 4 that revolubly supports a gauge drum 5 between the members. A strap 6 is secured at its opposite ends to the members 2 and 3 and extends around the forward side of the drum and a strap 7ª extends around the rear side of the drum. These straps not only brace the side members of the frame but also tend to remove any foreign matter that may cling to the drum in operation.

Two bearings 7 are formed on the rear end of the side member 2 of the frame and two similar bearings 8 are similarly formed on the rear end of the side member 3. The bearings 7 revolubly support a vertical shaft 9 having a cutting knife or disk 10 secured to its lower end and the bearings 8 revolubly support a similar vertical shaft 11 having a cutting knife or disk 12 secured to its lower end. The disks preferably overlap as shown. Each shaft is suspended in its bearings by the collars 13 and 14 that are adjustably secured to the shafts by the set screws 15. The upper collar on each shaft abuts the upper side of the upper bearing for the shaft and the lower collar abuts the lower side of the lower bearing for each shaft. The vertical adjustment of the cutting members on the frame is therefore maintained by the upper collars.

A transverse bracket 16 is loosely engaged on the upper portion of the shafts 9 and 11 by the adjustable collars 17 and the gears 18 and 19 are secured to the shafts respectively above the bracket 16 by the collars 20, that are part of the gears. These gears mesh with the gears 21 and 22 respectively which are secured to a shaft 23 revolubly mounted in bearings 24 formed on the bracket 16. A sprocket wheel 25 or other driven member is also secured on the shaft 23. The member 25 is connected by a chain, or other suitable means, to a source of power, such as the axle of a vehicle that is pulling the machine or to any rotating part that will drive the shaft 23.

The gears 21 and 22 are arranged on the shaft 23 so that they will drive the cutting disks in opposite directions, as indicated by the arrows in Fig. 1.

Two arms 27 project forwardly from the main frame 1 and are adapted to be pivotally attached to the vehicle that is pulling the machine, the pivotal movement of the arms being in a vertical direction. The arms may be adjustably secured to the main frame 1 as shown in Fig. 2 so that the height of the forward ends of the arms may be adjusted when it is desirable to do so.

In use the machine will be moved along over the row of beets, the gauge drum rolling upon each beet as it reaches it and flattening out the leaves. The rotating cutting members have been previously adjusted on the frame to engage the beets at the proper point below the base of the leaves so that when the drum is on a beet the cutting members will be in proper position to cut off the undesirable portion of the beet. When the cutting members are vertically adjusted on the frame relatively to the periphery of the drum all the beets are certain to be cut off at the same point.

The location of the shafts 9 and 11 with reference to the plane of the vertical axis of the drum is carefully determined in order that the forward edges of the cutting members shall meet the beets at the proper moments. It will be noted that the beet is in the V-shaped space between the two cutting disks while the drum is bearing on the top of the beet of usual size so that the disks pass into the beet a considerable distance before the drum leaves it. When the drum leaves a beet it does not sag to cause any change in the direction of the cut by the disks. The disks retain their direction of travel and do not split or otherwise harm the beet below the cut. The speed of rotation of the cutting disks is also predetermined so that the entire mechanism operates efficiently and without injury to the beets.

The machine could be attached to any of the beet lifting or digging machines and operate in conjunction therewith.

Longitudinally curved wings 26 project laterally from the periphery of the boss 12$^a$ of each cutting disk. The convex face of each wing is presented to the beet tops as they are severed and hence tends to project them by centrifugal force from the disk as the latter rotates.

What I claim is:

1. In a beet topper, a frame including frame sides each provided with a pair of vertically spaced alined bearings, shafts each supported in a respective pair of said bearings, said shafts being vertically adjustable in said bearings, means to hold the shafts in vertically adjusted position, a drum shaft extending between the frame sides, a drum mounted on said drum shaft to support the frame in position relative to beets and the like, means to drive the first mentioned shafts, a bracket at the upper ends of the first shafts and having lateral portions through which said shafts pass, collars on the shafts and located on opposite sides of the lateral bracket portions, means to hold the collars in adjusted position relative to the shafts, a drive shaft supported horizontally on said bracket, and operatively connected to the first shafts.

2. In a beet topper, a frame including frame sides each provided with a pair of vertically spaced alined bearings, shafts each supported in a respective pair of said bearings, adjustable collars on each shaft above and below the bearings, means to secure the collars in adjusted position on the shafts, a drum shaft extending between the frame sides, a drum mounted on said drum shaft to support the frame in position relative to beets and the like, means to drive the first mentioned shafts, a bracket at the upper ends of the first shafts and having lateral portions through which said shafts pass, collars on the shafts and located in opposite sides of the lateral bracket portions, means to hold the collars in adjusted position relative to the shafts, a drive shaft supported horizontally on said bracket, bevel gears connecting the drive shaft with the first shafts, and means for receiving a driving element on said bracket supported shaft.

In witness whereof I hereunto sign my name this 12th day of December, 1924.

JACOB J. SPRUNGER.